United States Patent [19]

Fagher et al.

[11] Patent Number: 6,043,312

[45] Date of Patent: *Mar. 28, 2000

[54] LOW FLAME AND SMOKE COMPOSITIONS FOR PLENUM CABLES

[75] Inventors: Richard H. Fagher, Parma Hts.; Vijayraj M. Kotian, Hudson, both of Ohio

[73] Assignee: The Furon Company, Aurora, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/803,866

[22] Filed: Feb. 20, 1997

Related U.S. Application Data

[60] Continuation of application No. 08/341,637, Nov. 17, 1994, abandoned, which is a division of application No. 07/746,623, Aug. 19, 1991, abandoned, which is a continuation-in-part of application No. 07/470,387, Jan. 26, 1990, abandoned, which is a continuation-in-part of application No. 07/371,935, Jun. 27, 1989, abandoned.

[51] Int. Cl.$^7$ .................................................... C08L 27/06

[52] U.S. Cl. ........................ 524/523; 524/527; 174/110 V

[58] Field of Search .............................. 174/110 S, 110 R, 174/110 V; 524/523, 527

[56] References Cited

U.S. PATENT DOCUMENTS

| 4,365,029 | 12/1982 | Reizer et al. | 523/437 |
| 4,380,606 | 4/1983 | Coran et al. | 525/196 |

*Primary Examiner*—Margaret G. Moore
*Attorney, Agent, or Firm*—Fay, Sharpe, Fagan, Minnich & McKee, LLP

[57] ABSTRACT

The present invention is directed to improved thermoplastic compositions which possess, when utilized for plenum cable construction, not only enhanced low flame and smoke properties, but also enhanced physical properties, such as tensile strength, elongation retention, high and low temperature stability, etc. The thermoplastic compositions may be utilized in various embodiments for producing both the insulation and jacketing layers of plenum cables. In addition, the present invention is also directed to the insulated wire and the jacketed electrical cable produced utilizing the improved thermoplastic compositions.

20 Claims, No Drawings and jacketed electrical cables produced utilizing the improved thermoplastic compositions.
LOW FLAME AND SMOKE COMPOSITIONS FOR PLENUM CABLES This is a continuation of application Ser. No. 08/341,637, filed Nov. 17, 1994, which, in turn, is a divisional application of Ser. No. 07/746,623, filed Aug. 19, 1991, which, in turn, is a continuation in part of Ser. No. 07/470,387, filed Jan. 26, 1990, which, in turn, is a continuation in part of Ser. No. 07/371,935, filed Jun. 27, 1989, each now abandoned.

BACKGROUND OF THE INVENTION

The present invention relates to improved thermoplastic compositions for plenum wire and cable construction which exhibit enhanced flame-resistant and low-smoke properties, as well as refined physical properties. In addition, the invention is directed to the insulated wire and jacketed electrical cables produced utilizing the improved thermoplastic compositions.

Plenum cables are the electrical and/or telecommunication cables (or wires) which are installed in environmental air spaces in the interior of many commercial and residential buildings. Previously, as a result of the use of closed loop heating and ventilation systems and the potential of recirculating the smoke produced by the burning of the cables, metal conduits were required for installation. However, with the advances in the last ten years in material development, particularly in regard to the use of fluorocarbon polymeric materials in plenum cable construction and the employment of a separate "jacketed" layer which surrounds the "insulated" electrical conductors, the National Electrical Code (NEC) permitted in the late 1970's the use of insulated and jacketed cables with fire-resistant and low-smoke properties in environmental air spaces without the use of metal conduits.

Although the use of fluorocarbon polymeric materials, such as fluorinated ethylene propylene, as a means of providing insulated and jacketed plenum cables having low smoke generating characteristics in conjunction with flame retardancy characteristics proved to be beneficial, such fluorocarbon polymeric materials are expensive and contain fluorine. When the fluoroplastic materials are heated to high temperatures, for example, in a fire, they release a complex series of potentially toxic and undesirable gases. Consequently, a number of alternative polymeric materials having attractive physical and insulating characteristics, as well as flame resistant and low smoke properties, such as poly(vinyl chloride), have been utilized in plenum cable construction.

Over the last few years, the present inventors and others have developed a number of poly(vinyl chloride) compositions in order to not only enhance the fire-resistant and low-smoke properties of the separate insulation and jacketing layers, but also to improve the flexibility characteristics of the plenum cables. In this regard, the flexibility of the plenum cables is extremely important for installation purposes in that the plenum cables must be flexible enough so that the installer can feed the cable through plenum areas with ease.

However, in order to improve flexibility, various plasticizers are normally added to the poly(vinyl chloride) compositions which are utilized to insulate and/or jacket the electrical conductors. Unfortunately, these plasticizers also increase the flammability of the poly(vinyl chloride) compositions. While the increase in flammability can be reduced somewhat through the use of various flame retardants, the addition of the flame retardants and other processing additives to the plasticized poly(vinyl chloride) compositions in many instances increases the amount of smoke produced by the burning poly(vinyl chloride) compositions.

As a result, a number of poly(vinyl chloride) compositions have been formulated in an attempt to overcome the flammability and smoke generation produced by the plasticized poly(vinyl chloride). However, improvements in the fire-resistant and low-smoke producing properties of the poly(vinyl chloride) compositions, as well as the cables' overall physical properties, would still be quite beneficial for plenum cable construction.

The present invention is directed to new and improved low cost thermoplastic compositions which may be utilized, in various embodiments, for constructing the insulation and jacketing components of plenum wire. While various other patents, including U.S. Pat. No. 4,670,494, entitled "Flame Retardant Low Smoke Poly(vinyl chloride) Thermoplastic Composition" issued on Jun. 2, 1987 to Nicholas J. Semenza, and assigned to the Gary Chemical Corp., describe poly (vinyl chloride)-chlorinated poly(vinyl chloride) compositions and the problems associated with the high flammability produced by the incorporation of plasticizers necessary for flexibility and the increased smoke generation produced by the addition of various flame retardants, the plenum compounds disclosed therein do not exhibit the enhanced properties produced by the present invention.

SUMMARY OF THE INVENTION

The present invention is directed to new thermoplastic compositions which possess, when utilized for plenum cable construction, not only improved low flame spreading and smoke-producing properties, but also improved physical properties, such as tensile strength, elongation retention, high and low temperature stability, etc. The thermoplastic compositions may be utilized in various embodiments for producing both the insulation and jacketing layers of plenum cables. In addition, the present invention is also directed to the insulated wires and the jacketed electrical cables produced utilizing the new thermoplastic compositions.

The thermoplastic compositions of the present invention which exhibit the improved fire-resistant and low-smoke producing properties, as well as the greater thermal stability, heat resistance, low temperature flexibility, and other physical properties desired of plenum cables, contain the following critical components: a poly(vinyl chloride) resin, a chlorinated poly(vinyl chloride) resin, an ethylene acrylic elastomer comprised of ethylene and methyl acrylate and a third monomer containing carboxylic curing sites, a hydrated alumina, a molybdenum compound, and a phosphate plasticizer, such as isodecyl diphenyl phosphate.

Moreover, the thermoplastic compositions also include heat stabilizers, antioxidants, lubricants, and secondary plasticizers, as well as flame retardants, such as antimony trioxide. Other flame retardants and/or smoke suppressants, such as magnesium hydroxide, partially hydrated magnesium calcium carbonate, zinc borate, and poly(vinyl chloride) fillers, such as calcium carbonate, aluminum silicates, etc. may also be included in the thermoplastic compositions. A further embodiment of the present invention includes a high molecular weight caprolactone polymer.

DETAILED DESCRIPTION OF THE INVENTION

The present invention relates to thermoplastic compositions which comprise a blend of from about 65 to about 95 parts per hundred resin of a poly(vinyl chloride) resin; from about 5 to about 35 parts per hundred resin of a chlorinated poly(vinyl chloride) resin; from about 10 to about 50 parts per hundred resin of an ethylene acrylic elastomer comprised of ethylene and methyl acrylate and a third monomer containing carboxylic curing sites; from about 10 to about 120 parts per hundred resin of a hydrated alumina; from about 2 to about 10 parts per hundred resin of a molybdenum compound; from about 4 to about 35 parts per hundred resin of isodecyl diphenyl phosphate; from about 6 to about 18 parts per hundred resin of a poly(vinyl chloride) heat stabilizer; from about 0.1 to about 0.3 parts per hundred resin of a poly(vinyl chloride) antioxidant; from about 0.5 to about 6.0 parts per hundred resin of a poly(vinyl chloride) lubricant; from about 7.0 to about 14.0 parts per hundred resin of a second poly(vinyl chloride) plasticizer, such as triisononyl trimellitate; from about 2.0 to about 6.0 parts per hundred resin of antimony trioxide. Additionally, the compositions can, with advantage, include from about 0 to 50 parts per hundred of a magnesium hydroxide; and, from about 0 to 50 parts per hundred of a partially hydrated magnesium calcium carbonate.

In addition, the thermoplastic composition of the present invention may also contain from about 2.0 to about 5.0 parts per hundred resin of titanium dioxide, from about 15.0 to about 35.0 parts per hundred resin of a high molecular weight caprolactone polymer, from about 4.0 to about 10.0 parts per hundred of zinc borate and/or from about 10.0 to about 20.0 parts per hundred resin of a poly(vinyl chloride) filler.

The improved properties exhibited by the present invention over the thermoplastic compositions known in the art, i.e. good thermal stability over a broad temperature range, high oxygen index, superior smoke suppression qualities (notably good smoke reduction under severe fire test conditions), and excellent aging properties manifested in good tensile and elongation retention, are attributed to the use of an ethylene acrylic elastomer as described above, as well as the inclusion of the critical ingredients set forth above in the quantities specified.

Suitable poly(vinyl chloride) resins include resinous homopolymers of vinyl chloride and copolymers of vinyl chloride with monomers such as vinylidene chloride, propylene or vinyl acetate, and blends of homopolymers and/or copolymers. Examples of usable commercially available resins include OXY 221®, OXY 253®, and OXY 282® trademarked and sold by the Occidental Chemical Corporation, GEON 86®, GEON 86x1®, GEON 86xPG®, GEON 855®, GEON 855x1®, GEON 85®, and GEON 84® trademarked and sold by the B.F. Goodrich Company, and Vista® 5265, Vista® 5305 and Vista® 5385 resins trademark and sold by Vista Chemical Co.

While it was originally thought, as set forth in application Ser. Nos. 371,935 and 470,387, now abandoned, that is was necessary to employ poly(vinyl chloride) resins produced by a mass polymerization process in order to obtain the improved physical properties such as tensile strength, elongation retention, high and low temperature stability, etc., it has been determined that it is the presence of the ethylene acrylic elastomer and more specifically an ethylene acrylic elastomer comprised of ethylene, methyl acrylate and a third monomer containing carboxylic curing sites which provide these enhanced properties. While not wanting to be bound by any explanation as to why the incorporation of the ethylene acrylic elastomer imparts these properties, it is believed that such elastomers magnify the beneficial effects imparted by the non-polymer components of the compositions while not detracting from the basic, desirable properties exhibited by the resins, i.e. the poly(vinyl chloride) and chlorindated poly(vinyl chloride). For example, the inclusion of the ethylene acrylic elastomer results in a more flexible compound with enhanced lower smoke characteristics and reduced heat release due to the ability of this elastomer to absorb fillers at high temperatures.

As noted, the ethylene acrylic elastomer useful in the compositions of the present invention is a copolymer of ethylene and methyl acrylate plus a third monomer containing carboxylic curing sites. Such elastomers are available from the elastomer chemicals department E.I. DePont de Nemours & Company under the trade name VAMAC®. Additional ethylene acrylic elastomers suitable for use in the present invention include VAMAC-B-124®, VAMAC N-123®, VAMAC MGB-124® trademarked and sold by E.I. DuPont de Numours & Company. VAMAC N-123® is described in DuPont literature as a masterbatch containing 100 parts of an ethylene/acrylic elastomer having carboxylic crosslinking sites and 23 parts of fumed silica, stablizers and processing aids. VAMAC B-124® is described in DuPont literate as a masterbatch containing 100 parts of ethylene/ acrylic elastomer having carboxylic crosslinking sites and 20 parts of N774 SRF carbon black and 4 parts of stabilizers and processing aids. VAMAC HGB-124® is described in DuPont literature as a higher viscosity version of VAMAC B-124®. As hereinafter used in both the specification and the claims, the term "copolymers of ethylene and methyl acrylate" containing carboxylic crosslinking sites includes such copolymers above and also includes the additional materials contained within the VAMAC masterbatches as well as in masterbatches of ethylene methyl acrylate copolymer elastomer containing carboxylic crosslinking sites available from other suppliers.

The polycaprolactones used in the present invention are high molecular weight caprolactone polymers which are highly compatible (i.e. miscible) with poly(vinyl chloride). Examples of such high molecular weight caprolactone polymers suitable for use in the present invention include Tone PCL-700® and Tone PCL-300®, polycaprolactones trademarked and sold by Union Carbide. Although these polycaprolactone polymers are 50% crystalline, when poly(vinyl chloride) is blended with the polycaprolactone polymers the crystallinity is destroyed and the composition becomes soft and pliable with excellent low and high temperature properties. As time elapses, the polycaprolactone polymers retain significant percentages of their crystallinity, producing marked improvements in physical properties (i.e. increased tensile strength, etc.) of the overall poly(vinyl chloride) composition.

Chlorinated poly(vinyl chloride), or CPVC, is now a widely available polymeric material that can be prepared commercially by well known methods such as by suspension chlorination of poly(vinyl chloride). More recently, techniques such as chlorination of poly(vinyl chloride) employing liquid chloride, such as that set forth in U.S. Pat. No. 4,377,459, have become available. In as much as chlorinated poly(vinyl chloride) resins are now well known in the art, they will not be discussed in great detail herein. Although the use of any suitable chlorinated poly(vinyl chloride) containing a sufficient weight percentage of chlorine for blending with poly(vinyl chloride) is contemplated as within the purview of this invention, TEMPRITE® 674x571, a chlorinated poly(vinyl chloride) resin trademarked and sold by B.F. Goodrich Co., is the preferred chlorinated poly(vinyl chloride) utilized in the present invention.

The molybdenum compound used in the instant invention can be obtained from any source which is not detrimental to the desired physical properties of the thermoplastic compositions of the invention. Although the preferred molybdenum compounds utilized in the present invention are molybdenum oxides, other molybdenum-containing salts selected from the group consisting of halides, phosphates, carbonates, oxyhalides, halide hydrates, acetates, nitrates, sulfides, chromates and molybdates can be used. Along this line, although Chemguard 911C®, a molybdenum oxide trademarked and sold by the Sherwin Williams Company may be utilized, Pol-u®, a molybdenum ($MoO_3$) composition trademarked and sold by Climax Molybdenum is preferred.

In addition to the above critical ingredients, hydrated alumina compounds such as Hydral 710B®, trademarked and sold by Alcoa Corp., or Micral 932 CM®, trademarked and sold by Solem Industries, antimony trioxide, available from Anzon American Corp. with or without lubricants (i.e. 80-090R® is a blend of 90% antimony oxide and 10% lubricant), and/or zinc borate available under the tradename ZB 223® from Amax Chemical Co., are added to the composition to act as flame retardants.

Moreover, plasticizers including an isodecyl diphenyl phosphate, such as Santicizer 148®, trademarked and sold by Monsanto Industrial Chemical Co., and triisononyl trimelitate, sold by the Exxon Corporation under the tradename Jayflex TINTM, as well as the white pigment, titanium dioxide (available under the tradename Ti-Pure R-902® from E.I. DuPont), are included in the compositions. The compositions also contain known poly(vinyl chloride) stabilizers such as H(DYT) D80®, a dibasic lead phthalate, available from Wyrough & Loser Corp., H(TBS)D80®, a tribasic lead sulfate, also sold by Wyrough & Loser Corp., or Lectro 90 TA®, and 50:50 blend of dibasic lead phthalate and tribasic lead sulfate sold by the Anzon American Corp., antioxidants such as Irganox 1010®, trademarked and sold by Ciba-Geigy Corporation, lubricants such as Struktol TRO16®, trademarked and sold by Struktol company, and calcium stearate available from Synthetic Products, Inc. Poly(vinyl chloride) fillers, such as Whitex Clay, an aluminum silicate based filler available from Freeport Kaolin Company, may also be included in the present invention.

Furthermore, in addition to the flame retardant compositions and/or fillers set forth above, the inventors have recently discovered that when additional flame retardant fillers, such as the magnesium hydroxide compositions sold by Solem Industries under the tradename Zerogen® (for example, Zerogen 10sp) or the partially hydrated magnesium calcium carbonate compositions sold by Atochem, Inc., Glen Rock, N.J., under the tradename Ultracarb® (for example, Ultracarb U5, a stearate coated grade having a 1% coating or Ultracarb 5–20 having a 2.0% coating), are incorporated into the present invention, further enhanced flame retardance and/or smoke suppression properties, as well as other physical properties are produced.

More particularly, the inventors have found that the flame retardant fillers sold under the Zerogen® and Ultracarb® designations contain divalent cations ($Mg^{+2}$, $Ca^{+2}$) which have a great affinity towards the neutralization of the reactive carboxylic groups on the ethylene acrylic elastomers (i.e. Vamac) utilized in the present invention. The Zerogen® and/or Ultracarb® compositions form ionic crosslinks with the carboxylic sites and prevent curing at high temperatures. This contributes to high temperature stability and the reduction in compound viscosity.

Furthermore, both the Zerogen® and the Ultracarb® compositions undergo endothermic decomposition reactions at significantly higher temperatures than alumina trihydrate (630° F. vs. 430° F.). The decomposition reactions release water vapor and/or other gases, such as carbon dioxide, which, in turn, dilute the combustible gases thereby providing a control for the smoke generated. In addition, upon decomposition or ignition the compositions flame retard by dehydrating and cooling the flame front.

One of the principal advantages produced by the addition of the magnesium hydroxide compositions sold under the Zerogen® name (which also include silane or oleic acid treated magnesium hydroxide compositions) is that the Zerogen® compounds decompose according to the following reaction to release approximately one third of their molecular weight in water:

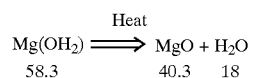

$$Mg(OH)_2 \xrightarrow{Heat} MgO + H_2O$$
$$58.3 \qquad\qquad 40.3 \quad 18$$

This thermal decomposition reaction results in better smoke suppression and enhanced flame retardation in the UL-910 Steiner Tunnel Test (ASTM E-84) when the Zerogen® compositions have been added to the invention.

The advantages produced when the Ultracarb® compositions are added to the present invention differ slightly due to differences in chemistry. In this regard, the Ultracarb® compositions are either stearate or oleic acid coated or non-coated fillers or extenders based upon a unique mineral mixture of partially hydrated calcium carbonate. The mixture, which is composed of the crystalline minerals Huntite ($Mg_3Ca(Co_3)_4$) and Hydromagnesite ($Mg_3(Co_3(OH_2)\cdot 3H_2O$), has a bimodal distribution of particle size with Huntite (0.1 to 0.4 microns) having a finer particle size than Hydromagnesite (0.4 to 10 microns). On exposure to heat, the minerals in the Ultracarb® compositions decompose according to the following reactions:

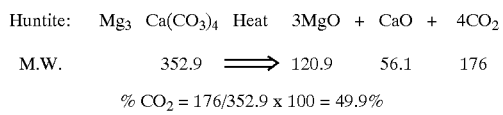

Huntite: $Mg_3\ Ca(CO_3)_4 \xrightarrow{Heat} 3MgO + CaO + 4CO_2$

M.W. $\quad 352.9 \qquad\Longrightarrow\quad 120.9 \quad 56.1 \quad 176$

% $CO_2$ = 176/352.9 x 100 = 49.9%

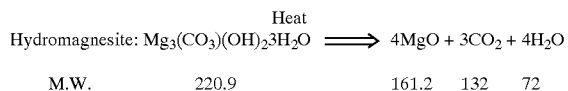

Hydromagnesite: $Mg_3(CO_3)(OH)_2 3H_2O \xrightarrow{Heat} 4MgO + 3CO_2 + 4H_2O$ M.W. $\qquad\qquad 220.9 \qquad\qquad\qquad 161.2 \quad 132 \quad 72$

% $CO_2$=132/220.9×100=59.8%

% $H_2O$=72/220.9×100=32.6%

Total % $CO_2$ generated=308/573.8×100=53.7%

Total % $H_2O$ generated=72/573.8×100=12.5%

Since these reactions are strongly endothermic and generate a considerable percentage of non-toxic and non-combustible gases, such as water vapor and 53.7% carbon dioxide over 560g° C. and 740° C. with an initial onset of decomposition at 228° C., the mixture absorbs heat energy and reduces flame temperature. These properties allow the Ultracarb® compositions to be an excellent flame retardant and/or smoke suppressant additive to the present invention. Furthermore, the higher decomposition temperature over a series of stages allows for higher compounding and processing temperatures than those permitted through the use of the low temperature decomposing aluminum trihydrate filler. This property, coupled with the advantages indicated above, produces not only good flame retardant and smoke suppression properties but also enhanced physical properties when utilized in the plenum compositions of the present invention.

The thermoplastic compositions of the present invention are produced according to blending and extrusion processes that are well known in the art. In this regard, the compositions may be prepared by blending the proper amounts (in parts per hundred resin) of poly(vinyl chloride) resin, chlorinated poly(vinyl chloride) resin and dibasic lead phthalate stabilizer in a high speed mixer, such as a laboratory Henschel mixer until a temperature of 140° F. is achieved. The specific amounts of the antioxidant, titanium oxide (i.e. white pigment), zinc borate (if desired), antimony trioxide, and the molybdenum compound are then added to the blend and the blend is mixed at a minimum of 2,000 rpm until a temperature of 220° F. is obtained. The mixer's speed is then reduced to 400 rpm and the plasticizers, namely the polycaprolactone (if desired), the isodecyl diphenyl phosphate, and the triisonoyl trimellitate and the poly(vinyl chloride)-lubricants, are added to the mixture. The mixture is then further mixed at 400 rpm until a free flowing fine powder is achieved, whereafter the mixer's speed is increased to 2000 rpm until the mixture reaches a temperature of about 230° F. The mixer's speed is then subsequently decreased to 400 rpm so that the specific amounts of the hydrated alumina compounds and, if desired, the calcium carbonate filler, the magnesium hydroxide compositions and/or the partially hydrated magnesium calcium carbonate compositions can be added to the mixture. Upon the addition of these compounds, the mixer's speed is increased to 2000 rpm and the mixture is mixed until a temperature of 230° F. is reached.

The above dry blend may then be transferred to a laboratory Banbury high intensity mixer and the desired amount of ethylene acrylic elastomer can be added to the blend. The blend is further processed in the Banbury mixer at a temperature of 370° F. (stock temperature of 385° F.), whereinafter the blend is immediately transferred to a hot two-roll counter rotating mill and mixed for 4 to 5 minutes (stock temperature approximately 220–230° F.). The compound may then be removed from the two roll mill and pelletized. The thermoplastic compositions of the present invention may be embodied in various formulations for use as either the insulation or jacketing component of plenum cables. The insulation and jacketing components produced by the various formulations of the present invention exhibit the physical properties desired for plenum compounds, as well as the low flame resistant and low smoke producing properties required for Underwriters Laboratories 910 Steiner Tunnel approval.

In this regard, the general and the more preferred general formulations of the present invention for preparation of the insulation component of the plenum cable are as follows:

GENERAL FORMULATION FOR INSULATION COMPONENT

| Percent by weight Resin (phr)* | Ingredients |
|---|---|
| 65–95 | a poly(vinyl chloride) resin |
| 5–35 | a chlorinated poly(vinyl chloride) resin |
| 2–20 | a molybdenum compound |
| 10–45 | a hydrated alumina compound |
| 4–35 | an isodecyl diphenyl phosphate |
| 6–18 | a poly(vinyl chloride) heat stabilizer |
| .1–.3 | a poly(vinyl chloride) antioxidant |
| 0.5–6 | a poly(vinyl chloride) lubricant |
| 7–14 | a secondary poly(vinyl chloride) plasticizer |
| 2–6 | antimony trioxide |
| 0–5 | titanium dioxide |
| 10–30 | an ethylene acrylic elastomer |
| 0–10 | zinc borate |
| 0–20 | a poly(vinyl chloride) filler |
| 0–30 | a high molecular weight caprolactone polymer |
| 0–50 | a magnesium hyroxide filler |

MORE PREFERRED GENERAL FORMULATION FOR INSULTION COMPONENT

| Percent by Weight Resin (phr)* | Ingredient |
|---|---|
| 65–95 | a poly(vinyl chloride) resin |
| 5–35 | a chlorinated poly(vinyl chloride) resin |
| 2–10 | a molybdenum oxide composition |
| 10–45 | a hydrated alumina compound |
| 12–35 | an isodecyl diphenyl phosphate |
| 6–18 | a poly(vinyl chloride) heat stabilizer |
| .1–.3 | a poly(vinyl chloride) antioxidant |
| 0.5–6 | a poly(vinyl chloride) lubricant |
| 7–14 | a secondary poly(vinyl chloride) plasticizer such as triisononyl trimellitate |
| 2–6 | antimony trioxide |
| 0–5 | titanium dioxide |
| 10–30 | an ethylene acrylic elastomer |
| 10–50 | a magnesium hydroxide filler |

*Levels of all of the chemical ingredients used are listed as parts per hundred of the sum of the poly(vinyl chloride) and chlorinated poly(vinyl chloride) components.

In addition, the general and the more preferred general formulations for the preparation of the jacketing compound of the plenum cable are as follows:

| GENERAL FORMULATION FOR JACKETING COMPONENT | |
|---|---|
| Percent by Weight Resin (phr)* | Ingredients |
| 65–95 | a poly(vinyl chloride) resin |
| 5–35 | a chlorinated poly(vinyl chloride) resin |
| 2–10 | a molybdenum compound |
| 45–120 | a hydrated alumina compound |
| 10–35 | an isodecyl diphenyl phosphate |
| 10–18 | a poly(vinyl chloride) heat stabilizer |
| .1–.3 | a poly(vinyl chloride) antioxidant |
| 0.5–6 | a poly(vinyl chloride) lubricant |
| 7–14 | a secondary poly(vinyl chloride) plasticizer |
| 2–6 | antimony trioxide |
| 0–5 | titanium dioxide |
| 30–50 | an ethylene acrylic elastomer |
| 4–10 | zinc borate |
| 10–20 | a poly(vinyl chloride) filler |
| 0–40 | a high molecular weight caprolactone polymer |
| 0–50 | a magnesium hydroxide filler |
| 0–60 | a partially hydrated magnesium calcium carbonate |

| MORE PREFERRED GENERAL FORMULATION FOR JACKETING COMPONENT | |
|---|---|
| Percent by Weight Resin (phr)* | Ingredients |
| 65–75 | a poly(vinyl chloride) resin |
| 5–35 | a chlorinated poly(vinyl chloride) resin |
| 2–10 | a molybdenum oxide composition |
| 45–120 | a hydrated alumina compound |
| 12–35 | an isodecyl diphenyl phosphate |
| 10–18 | a dibasic lead phthalate |
| .1–.3 | a poly(vinyl chloride) antioxidant |
| 0.5–6 | a poly(vinyl chloride) lubricant |
| 7–14 | a secondary poly(vinyl chloride) plasticizer such as triisononyl trimellitate |
| 2–6 | antimony trioxide |
| 2–5 | titanium dioxide |
| 30–50 | an ethylene acrylic elastomer |
| 4–10 | zinc borate |
| 10–20 | a poly(vinyl chloride) filler |
| 15–35 | a high molecular weight caprolactone polymer |
| 15–50 | a magnesium hydroxide filler |
| 10–60 | a partially hydrated magnesium calcium carbonate |

*Levels of all of the chemical ingredients used are listed as parts per hundred of the sum of the poly(vinyl chloride) and chlorinated poly(vinyl chloride) components.

The insulation and jacketing compositions prepared according to the formulations and blending procedure set forth above can then be made into the insulation and/or jacketing components of the plenum cables through extrusion processes which are well known in the art. More particularly, after the desired blended formulation is achieved, the pelletized compound is then transferred to an extruder where the pellets are fluxed, further mixed, and forced through a die, exiting as either a hot, soft continuous sheeting which may then be subsequently cooled on a roll stock or the material may be extruded over (i) a solid or standard electrical conductor formed from copper, nickel, tinned copper, silvered copper, or other suitable electrically conductive material to form an insulated wire, or over (ii) one or more insulated wire and/or other internal cable components to produce a protective jacketing layer. Although the radial thickness of the insulation and jacketing layers may vary, the insulation layer is commonly from about 5 to about 13 mils and the radial thickness of the jacket layer is commonly from about 13 to about 25 mils depending upon the size and voltage characteristics desired for the particular plenum cable. Similarly, while the conductor may be of any suitable diameter, the conductor is commonly from about 24 AWG to about 12 AWG in size.

The following examples further illustrates the present invention.

EXAMPLE 1

A series of poly(vinyl chloride)-chlorinated poly(vinyl chloride) compositions of varying formulations were prepared according to the General Formulations for Insulated and Jacketing Components set forth above. The specific ingredients of each formulation along with their particular weight levels in parts per hundred resin (i.e. PVC and CPVC) are given below in Tables 1 and 2, for the insulation formulations and the jacketing formulations, respectively.

TABLE 1

Wire Insulation Formulations

| Material | A | B | C | D | E | F | G | H | I | J |
|---|---|---|---|---|---|---|---|---|---|---|
| Geon 855 × 1[1] | 75.0 | 75.0 | 75.0 | 75.0 | 75.0 | 75.0 | 75.0 | 75.0 | 75.0 | 75.0 |
| Temprite 674 × 571[2] | 25.0 | 25.0 | 25,0 | 25.0 | 25.0 | 25.0 | 25.0 | 25.0 | 25.0 | 25.0 |
| Vamac N-123[3] | 10.0 | 10.0 | — | — | — | — | — | — | — | — |
| Vamac G[4] | — | — | 25.0 | 25.0 | 10.0 | 10.0 | 25.0 | 25.0 | 10.0 | 10.0 |
| Santicizer 148[5] | 30.0 | 30.0 | 30.0 | 4.0 | 30.0 | 30.0 | 30.0 | 10.0 | 20.0 | 20.0 |
| H(DYT) D80[6] | 6.5 | 6.5 | 6.5 | 7.5 | 6.5 | 6.5 | 6.5 | 7.5 | — | — |
| H(TBS) D80[7] | 6.5 | 6.5 | 6.5 | 7.5 | 6.5 | 6.5 | 6.5 | 7.5 | — | — |
| Irganox 1010[8] | 0.25 | 0.25 | 0.25 | 0.25 | 0.25 | 0.25 | 0.25 | 0.25 | 0.25 | 0.25 |
| $TiO_2$, R902[9] | 2.0 | 2.0 | 2.0 | 2.0 | 2.0 | 2.0 | 2.0 | 2.0 | 2.0 | 2.0 |
| Strucktol TRO16[10] | 1.0 | 1.0 | 1.0 | 2.0 | 1.0 | 1.0 | 1.0 | 1.0 | 1.0 | 1.0 |
| Hydral 710B[11] | 25.0 | 25.0 | 40.0 | — | 25.0 | 25.0 | 40.0 | — | 25.0 | 25.0 |
| Micral 932CM[11] | — | — | — | 40.0 | — | — | — | 40.0 | — | — |
| Antimony Trioxide | 2.0 | 2.0 | 2.0 | 4.0 | 2.0 | 2.0 | 2.0 | 4.0 | — | — |
| Pol-U[12] | 20.0 | 20.0 | 4.0 | 4.0 | — | 4.0 | — | — | 4.0 | 4.0 |
| Chemguard 911C[13] | — | — | — | — | 20.0 | — | 20.0 | 20.0 | — | — |
| Jayflex TINTM[14] | — | 8.0 | 8.0 | 8.0 | 8.0 | 8.0 | 8.0 | 8.0 | 12.0 | 12.0 |
| P-tone 700[15] | — | — | — | 28.0 | — | — | — | 20.0 | — | — |
| Whitex Clay[16] | — | — | — | 15.0 | — | — | — | 10.0 | — | — |
| Zinc Borate ZB223[17] | — | — | — | 5.0 | — | — | — | 5.0 | — | — |
| Lectro 90 TA[18] | — | — | — | — | — | — | — | — | 6.7 | 8.7 |
| 80-090 R[19] | — | — | — | — | — | — | — | — | 2.2 | 2.2 |

TABLE 2

Cable Jacket Formulations

| Materials | 1 | 2 | 3 | 4 | 5 | 6 | 7 | 8 | 9 |
|---|---|---|---|---|---|---|---|---|---|
| Geon 855 × 1[1] | 70.0 | 75.0 | 75.0 | 75.0 | 70.0 | 70.0 | 70.0 | 75.0 | 75.0 |
| Temprite 674 × 571[2] | 30.0 | 25.0 | 25.0 | 25.0 | 30.0 | 30.0 | 30.0 | 25.0 | 25.0 |
| Santicizer 148[5] | 16.0 | 20.0 | 10.0 | — | 16.0 | 10.0 | — | 25.0 | 20.0 |
| $TiO_2$, R-902[9] | 4.0 | 2.0 | 2.0 | 4.0 | 4.0 | 4.0 | 4.0 | 2.0 | 2.0 |
| Pol-U[12] | 4.0 | 4.0 | 4.0 | 4.0 | 4.0 | 4.0 | 4.0 | 4.0 | 4.0 |
| Micral 932 CM[11] | 90.0 | 70.0 | 70.0 | 70.0 | 90.0 | 90.0 | 90.0 | 70.0 | 70.0 |
| H(DYT) D80[6] | 8.0 | 6.5 | 6.5 | 6.5 | 8.0 | 8.0 | 8.0 | 6.5 | 6.5 |
| H(TBS) D80[7] | 8.0 | 6.5 | 6.5 | 6.5 | 8.0 | 8.0 | 8.0 | 6.5 | 6.5 |
| Antimony Trioxide | 4.0 | 4.0 | 4.0 | 4.0 | 4.0 | 4.0 | 4.0 | 4.0 | 4.0 |
| VAMAC-G[4] | 45.0 | 35.0 | 35.0 | 35.0 | 45.0 | 40.0 | 45.0 | 35.0 | 35.0 |
| Irganox 1010[8] | 0.3 | 0.3 | 0.3 | 0.3 | 0.3 | 0.3 | 0.3 | 0.3 | 0.3 |
| Zinc Borate ZB223[17] | 7.0 | — | 6.0 | 6.0 | 7.0 | 7.0 | 7.0 | 6.0 | 6.0 |
| Structol TRO16[10] | 2.0 | 2.0 | 2.0 | 2.0 | 2.0 | 2.0 | 2.0 | 2.0 | 2.0 |
| Jayflex TINTM[14] | 7.0 | 7.0 | 7.0 | 7.0 | 7.0 | 7.0 | 7.0 | 7.0 | 7.0 |
| Whitex Clay[16] | 15.0 | 15.0 | 15.0 | 15.0 | 20.0 | 20.0 | 20.0 | 15.0 | 15.0 |
| P-tone 700[15] | 20.0 | — | 20.0 | 30.0 | 25.0 | 30.0 | 40.0 | — | 10.0 |

Notes
[1] Geon 855 × 1 ®, a poly(vinyl chloride) chloride resin produced by a mass polymerization process
[2] Temprite 674 × 571 ®, a chlorinated poly(vinyl chloride) resin
[3] VAMAC N-123 ®, an ethyene acrylic elastomer
[4] VAMAC G ®, an ethyene acrylic elastomer
[5] Santicizer 148 ®, an isodecyl diphenyl phosphate
[6] H(DYT) D80 ®, a dibasic lead phthalate
[7] H(TBS) D80 ®, a tribasic lead sulfate
[8] Irganox 1010 ®, a standard PVC antioxidant
[9] R902 ®, titanium dioxide, white pigment
[10] Struktol TRO16 ®, a lubricant
[11] Hydral 710B ® or Micral 932 CM ®, hydrated alumina compounds
[12] Pol-U ®, a molybdenum oxide ($MoO_3$) composition
[13] Chemguard 911C ®, a molybdenum oxide composition
[14] Jayflex TINTM ®, (triisononyl trimellitate); a plasticizer
[15] P-tone 700 ®, a high molecular weight caprolactone polymer
[16] Whitex Clay ®, an aluminum silicate filler
[17] ZB 223 ®, zinc borate, a flame retardant
[18] Lectro 90 TA ®, a 50:50 blend of dibasic lead phthalate and tribasic lead sulfate
[19] 80-090 ®, a 90:10 percentage blend of antimony oxide and lubricant (10%)

The above listed insulation and jacketing formulations were made into sheets according to the procedure outlined above for the purposes of testing the various insulation and jacketing compositions' improved physical, as well as low smoke and/or flame properties. More particularly, tests for Specific Gravity (i.e. density of solid plastics by displacement), Hardness (i.e. indentation hardness), Tensile Properties (i.e. strength and elongation), Limited Oxygen Index (i.e. minimum concentration of oxygen in a flow mixture that will just support a flame), and Brittleness (i.e. temperature at which plastics exhibit brittle failure) were performed using ASTM (American Society for Testing and Materials, Philadelphia, Pa.) standard procedures D-792, D-2240, D-412, D-2863, and D-746, respectively. The Specific Optical Density of Smoke (i.e. Dm smoldering and Dm flaming) of the insulation and jacketing composition of the present invention were determined using the ASTM test procedure E662-79. Moreover, the tensile and elongation retention properties of the insulation and jacketing compositions of the present invention were determined according to the Air Oven Aging test of the Insulated Cable Engineering Association, ICEA S-19-81. These test procedures are expressly incorporated herein by reference. The test results are set forth below in Table 3 for the insulation formulations and Table 4 for the jacketing formulations.

TABLE 3

| Physical Properties | A | B | C | D | E | ASTM Method |
|---|---|---|---|---|---|---|
| Density, gm/cm$^3$ | 1.604 | 1.574 | 1.489 | 1.548 | 1.548 | D-792 |
| Hardness, Shore A, 10 sec. | 96 | 94 | 94 | 93 | 92 | D-2240 |
| Hardness, Shore D, 10 sec. | 67 | 60 | 57 | 59 | 59 | D-2240 |
| Tensile Strength, psi | 2903 | 2444 | 2668 | 2540 | 2462 | D-412 |
| Ultimate Elongation, % | 167 | 210 | 220 | 150 | 177 | D-412 |
| Limiting Oxygen Index, % | 47.9 | 42.0 | 37.5 | 42.6 | 35.5 | D-2863 |
| Dm, smoldering | 232 | 259 | 187 | 260 | 193 | ANSI/ASTM E662-79 |
| Dm, flaming | 212 | 265 | 210 | 206 | 229 | ANSI/ASTM E662-79 |
| Brittle Temp, ° C. | −2.5 | −6.0 | −14.0 | −7.2 | −3.5 | D-746 |
| Air Oven Aging (7 days at 100° C.) | | | | | | |
| Tensile Retention, % | 207 | 163 | 114 | 125 | 113 | ICEA S-19-81 |
| Elongation Retention, % | 32 | 48 | 82 | 85 | 92 | ICEA S-19-81 |

| Physical Properties | F | G | H | I | J | ASTM Method |
|---|---|---|---|---|---|---|
| Density, gm/cm$^3$ | 1.494 | 1.527 | 1.582 | 1.474 | 1.473 | D-792 |
| Hardness, Shore A, 10 sec. | 92 | 95 | 94 | — | — | D-2240 |
| Hardness, Shore D, 10 sec. | 57 | 59 | 58 | 60 | 59 | D-2240 |
| Tensile Strength, psi | 2707 | 2467 | 2354 | 2700 | 2725 | D-412 |
| Ultimate Elongation, % | 220 | 217 | 134 | 215 | 200 | D-412 |
| Limiting Oxygen Index, % | 35.5 | 37.9 | 38.9 | 35.0 | 34.0 | D-2863 |
| Dm, smoldering | 246 | 177 | 185 | 224 | 252 | ANSI/ASTM E662-79 |
| Dm, flaming | 319 | 219 | 246 | 158 | 210 | ANSI/ASTM E662-79 |
| Brittle Temp, ° C. | −8.0 | −7.6 | +2.6 | −4.0 | −3.0 | D-746 |
| Air Oven Aging (7 days at 100° C.) | | | | | | |
| Tensile Retention, % | 118 | 121 | 115 | — | — | ICEA S-19-81 |
| Elongation Retention, % | 86 | 81 | 78 | — | — | ICEA S-19-81 |

TABLE 4

| Physical Properties | 1 | 2 | 3 | 4 | 5 | ASTM Method |
|---|---|---|---|---|---|---|
| Density, gm/cm$^3$ | 1.583 | 1.583 | 1.565 | 1.565 | 1.577 | D-792 |
| Hardness, Shore A, 10 sec. | 87 | 95 | 93 | 92 | 82 | D-2240 |
| Hardness, Shore D, 10 sec. | 56 | 65 | 57 | 56 | 44 | D-2240 |
| Tensile Strength, psi | 2800 | 2870 | 2283 | 2114 | 1801 | D-412 |
| Elongation, % | 230 | 210 | 203 | 160 | 195 | D-412 |
| Limiting Oxygen Index, % | 42.5 | 42.5 | 42.4 | 43.6 | 44.4 | D-2863 |
| Dm, smoldering | 85.0 | 99.9 | 115.4 | 104.8 | 136.4 | ANSI/ASTM E662-79 |

TABLE 4-continued

| | | | | | | |
|---|---|---|---|---|---|---|
| Dm, flaming | 113.4 | 117.0 | 202.0 | 112.0 | 130.8 | ANSI/ASTM E662-79 |
| Brittle Temp, ° C. | −15.0 | +2.6 | −1.2 | −1.2 | −9.6 | D-746 |
| Air Oven Aging (7 days at 100° C.) | | | | | | |
| Tensile Retention, % | 112.3 | 105 | 112 | 114 | 106 | ICEA S-19-81 |
| Elongation Retention, % | 65.8 | 49.2 | 85.0 | 82.6 | 91.6 | ICEA S-19-81 |

| Physical Properties | 6 | 7 | 8 | 9 | ASTM Method |
|---|---|---|---|---|---|
| Density, gm/cm$^3$ | 1.597 | 1.588 | 1.590 | 1.578 | D-792 |
| Hardness, Shore A, 10 sec. | 85 | 87 | 91 | 90 | D-2240 |
| Hardness, Shore D, 10 sec. | 49 | 52 | 65 | 58 | D-2240 |
| Tensile Strength, psi | 2095 | 2243 | 2304 | 2324 | D-412 |
| Elongaton, % | 207 | 190 | 207 | 220 | D-412 |
| Limiting Oxygen Index, % | 43.0 | 43.3 | 49.8 | 52.1 | D-2863 |
| Dm, smoldering | 119.3 | 146.0 | 134.7 | 158.0 | ANSI/ASTM E662-79 |
| Dm, flaming | 119.8 | 123.4 | 136.9 | 179.5 | ANSI/ASTM E662-79 |
| Brittle Temp, ° C. | −6.4 | −6.0 | +1.4 | −2.0 | D-746 |
| Air Oven Aging (7 days at 100° C.) | | | | | |
| Tensile Retention, % | 108 | 96.5 | 109 | 97.9 | ICEA S-19-81 |
| Elongation Retention, % | 79.7 | 102.6 | 54.7 | 59.1 | ICEA S-19-81 |

The test results indicate that the insulation and jacketing compositions of the present invention exhibit improved physical, as well as flame resistant and smoke producing properties. This is particularly true in respect to Insulation Composition C and Jacketing Composition 1, the preferred embodiments of the present invention.

EXAMPLE 2

In order to further evaluate the enhanced results produced by the preferred embodiment of the present invention, Insulating Component C and Jacketing composition 1 were extruded on wire and retested according to the test methodology set forth above. The improved results demonstrated by the preferred embodiments of the present invention on wire are as follows:

TABLE 5

PROPERTIES ON WIRE

| | Insulation Composition C | Jacketing Composition 1 | Test Method |
|---|---|---|---|
| Tensile Strength psi | 3180 | 2637 | ASTM D 412 |
| Elongation, % | 239 | 174 | ASTM D 412 |
| Air Aging | | | |
| Tensile Retention, % | 135/135 | 139.1/138.4 | 7 days/ 10 days at 100° C. (ICEA S-66-524) |
| Elongation, Ret. % | 81/84 | 85.6/74.0 | 7 days/ 10 days at 100° C. (ICEA S-66-524) |

Moreover, in order to evaluate the high temperature stability for the preferred insulation (i.e. composition C) and jacket (i.e. composition 1) compounds of the present invention, an Air Oven Aging evaluation was performed according to Underwriters Laboratory test procedure U.L. Sub. 444 incorporated herein by reference. The results of the Air Aging test are set forth in Table 6 below. In addition, the minimum Underwriters Laboratory requirements for the various temperature ratings of U.L. 1581 are defined in Table 7.

TABLE 6

AIR OVEN AGING

| Product | 7 Days at 100° C. 60° C. Rating | 10 Days at 100° C. 75° C. Rating | 7 Days at 121° C. 90° C. Rating | 7 Days at 136° C. 105° C. Rating |
|---|---|---|---|---|
| Insulation Compound C | | | | |
| Tensile Ret., % | 134.5 | 134.5 | 143.5 | 155.4 |
| Elongation Ret., % | 81.2 | 84.0 | 82.1 | 67.6 |
| Jacket Compound 1 | | | | |
| Tensile Ret., % | 139.1 | 138.4 | 120.6 | 135.5 |
| Elongation Ret., % | 85.6 | 74.0 | 78.9 | 79.4 |

TABLE 7

Minimum UL Requirements for the Various Temperature Ratings (UL 1581)

| | 60° C. Rating 100° C. 7 days (168 hours) | 75° C. Rating 100° C. 10 days (240 hours) | 90° C. Rating 121° C. 7 days (168 hours) | 105° C. Rating 136° C. 7 days (168 hours) |
|---|---|---|---|---|
| Wire Insulation | | | | |
| Tensile Ret., % | 70 | 70 | 70 | 70 |
| Elongation, Ret., % | 65 | 65 | 65 | 65 |
| Cable Jacket | | | | |
| Tensile Ret., % | 70 | 70 | 70 | 70 |
| Elongation, Ret., % | 45 | 45 | 45 | 45 |

The above results indicate that the compositions of the present invention, particularly the preferred embodiments, exhibit greatly improved physical properties (i.e. greater tensile strength, elongation retention, high and low temperature stability, etc.) as well as enhanced low-smoke producing, and flame resistant properties. The advanced technology exhibited in the insulation and jacket compositions of the present invention demonstrates significant progress in the properties of smoke reduction and flame suppression without sacrificing processability or other physical properties.

In this regard, over the past several years a number of papers and patents (including U.S. Pat. No. 4,670,494) have reported progress in significantly altering the flammability and smoke emission characteristics of poly(vinyl chloride) and other compounds. Often these procedures have not been commercially practical because they altered other necessary physical and chemical properties. Hence, improved combustibility performance would be useless unless the material could retain its processability and performance related physical properties.

The high temperature stability of the insulation and jacket compositions (see Tables 3 and 4) is only one of the many improved physical performance properties exhibited by the present invention. The compositions of the present invention have passed the 90° C. rating test when aged in a precision oven at 121° C. for seven days. To the inventors' knowledge, compositions of the present invention are the first poly(vinyl chloride) based compounds for plenum cable use that have obtained UL approval for a 90° C. temperature rating. Thus, the insulation and jacket compositions of the present invention exhibit greatly improved properties over the art.

Along this line, an additional physical performance related property is brittleness (see Tables 1 and 2) which reflects the temperature in °C. at which 50% of the specimens tested fail under specified impact conditions (ASTM D-746). This test indicates:

1. Aging effects such as crystallization;
2. Low temperature incompatibility of plasticizer systems used in test specimens; and,
3. Product durability and plyability in regard to flexing under cold weather conditions.

As demonstrated by the data set forth above, the compositions of the present invention, particularly the preferred embodiments, exhibit enhanced brittleness along with their other related physical properties.

As indicated above, the improved properties produced by the present invention, i.e. good thermal stability over a broad temperature range, high oxygen index, superior smoke suppression qualities (notably good smoke reduction under severe fire test conditions), and excellent aging properties manifested in good tensile and elongation retention, are attributed to the inclusion of the ethylene acrylic elastomer, as well as the inclusion of the critical ingredients set forth above in the quantities specified.

EXAMPLE 3

Furthermore, in order to more clearly demonstrate the improved fire resistance and low smoke producing properties of the present invention, the flame spread and smoke density characteristics of the plenum cable of the present invention, consisting of insulation composition C and jacketing composition 1 (2 pair 18 AWG electrical conductors 6 mil Composition C, 22 mil Composition 1), were determined according to U.L. 910, the "Steiner Tunnel" test. The plenum cable of the present invention was made by extruding the Composition C insulation material at a thickness of 6 mil over a copper electrical conductor. The insulated electrical conductors produced were then combined and jacketed at a thickness of 22 mil.

The Steiner Tunnel test was conducted by Underwriters Laboratories personnel in a Steiner Tunnel under the normal flame spread and smoke rating test conditions according to the test standards of Underwriters Laboratories which were first published in 1982 (Underwriters Laboratories, Inc. "Standard for Test Method for Fire and Smoke Characteristics of Cables Used in Air Handling Spaces", U.L. 910, First Edition as revised Apr. 30, 1982, pages 1–14). The UL 910 Steiner Tunnel test has now become the standard testing mechanism for classifying cables for their suitability of use as plenum cables by determining fire spread and smoke density characteristics of cables in air handling spaces. In this regard, for a cable to the classified as one suitable for use as a plenum cable by Underwriters Laboratories under UL 910, it must have a maximum flame spread of 5 feet, a peak smoke density of 0.5 and an average optical density of 0.15.

In the U.L. 910 Steiner Tunnel test, 60 cable lengths, each with two pairs of conductors in its core, were placed in a ladder-like tray within the prescribed test chamber. After following the prescribed calibration procedures, the cables were exposed at one end to a 300,000 BTU methane flame for a prescribed period of time while flame propagation and smoke generation in terms of specific optical density were calculated. Specifically, upon application of the flame at one end of the cable lengths, the maximum flame spread (i.e. the maximum distance the flame was seen to extend beyond the point of application), time to ignition and time to reach maximum flame for each of the test specimens were determined. The results of this test are set forth in Table 9.

In addition to the flame spread characteristics, the smoke density was measured at a vent pipe from the test chamber using a photoelectric cell. The smoke density was determined by the following formula:

$$\text{Smoke density} = \log_{10} = T_o/T$$

in which $T_o$ is the initial light transmission without smoke and T is the light transmission during the test; this varies with the amount of smoke.

TABLE 9

| | UL 910 PROPERTIES | | |
|---|---|---|---|
| Property | Unit | UL 910 Spec. | Present Invention Insulation Composition C and Jacketing Composition 1 |
| Max. Optical Density Log$_{10}$ | T$_o$/T | 0.50 | 0.33 |
| Avg. Optical Density | T$_o$/T | 0.1 | 0.06 |
| Max. Flame Spread | Feet | 5.0 | 2.50 |
| Time to Ignition | Min. | — | 0.40 |
| Time to Maximum OD | Min. | — | 4.12 |

The results indicate that the preferred embodiments of the present invention exceed the requirements for plenum cable use in effect throughout the United States. Furthermore, the delayed ignition time and time to maximum O.D. of the preferred embodiment of the present invention is quite high (i.e. time to ignite 0.40 min. and time to maximum O.D. 4.12 min.). In this regard, the delayed ignition time is a measure of how quickly the particular material catches on fire (i.e. the higher the delayed ignition time and maximum O.D. time, the better fire protection properties exhibited by the material).

EXAMPLE 4

In order to show the improved results produced through the incorporation of the additional flame retardant fillers, such as the magnesium hydroxide compositions sold by Solem Industries under the tradename Zerogen®, or the partially hydrated magnesium calcium carbonate compositions sold by Atochem, Inc., under the tradename Ultracarb®, the additional flame retardant fillers were added to the compositions of the invention. The resulting formulations were evaluated according to the procedures utilized in Examples 1–4 above. The results are set forth below in Table 10–15.

TABLE 10

Improved Insulation Formulations

|  | C | L | M |
|---|---|---|---|
| Geon 855 × 1 | 75.00 | — | — |
| Geon 86 × 1 | — | 70.00 | 70.00 |
| Temprite 674 × 571 | 25.00 | 30.00 | 30.00 |
| Vamac-G | 25.00 | 20.00 | 35.00 |
| Sanitizer 148 | 30.00 | 8.00 | 8.00 |
| H(DYT) D80 | 13.00 | 12.00 | 12.00 |
| Irganox 1010 | .25 | .30 | .30 |
| TiO$_2$, R902 | 2.00 | 2.00 | 2.00 |
| Struktol TR-016 | 1.00 | 1.00 | 1.00 |
| Hydral 710B | 40.00 | — | — |
| Micral 932SP | — | 20.00 | 20.00 |
| Antimony Trioxide | 2.00 | 4.00 | 4.00 |
| Pol-U | 4.00 | 4.00 | 4.00 |
| Jayflex TINTM | 8.00 | 8.00 | 8.00 |
| P-tone 700 | — | 20.00 | 20.00 |
| Calcium Stearate | — | 1.50 | 1.50 |
| Zerogen 10 | — | 20.00 | 20.00 |

TABLE 11

Improved Insulation Formulations
Physical Properties

|  | C | L | M |
|---|---|---|---|
| Density, gm/cm$^3$ | 1.489 | 1.488 | 1.459 |
| Hardness, Shore A (10 sec.) | 94 | 90 | 94 |
| Hardness, Shore D (10 sec.) | 57 | 49 | 58 |
| Tensile Strength, psi | 2668 | 2826 | 2740 |
| Ultimate Elongation, % | 220 | 248 | 298 |
| Limiting Oxygen Index, % | 37.5 | 44 | 42 |
| Dm Smoldering | 187 | 105 | 99 |
| Dm Flaming | 210 | 154 | 121 |
| Brittle Temp., ° C. | −14 | −3.0 | −9.0 |
| Air Oven Aging (7 days at 100° C.) | | | |
| Tensile Retention, % | 114 | 112 | 118 |
| Elongation Retention, % | 82 | 86 | 91 |

As indicated in the insulation formulations set forth above in Tables 10–11, the addition of the Zerogen® magnesium hydroxide ingredient, as well as various changes in the amount of ethylene acrylic elastomers and polycaprolactones used and the amount of hydrated alumina compounds incorporated, improved various properties of Insulation Formulation C, the previous preferred insulation composition. In this regard, the addition of Zerogen® enhanced the limiting oxygen index, tensile strength, elongation, Dm smoldering, and/or flaming, etc. of the two improved insulation formulation of Formulation C. As a result of these improvements, insulation formulation L is the preferred embodiment for the improved insulation formulations.

TABLE 12

Improved Jacket Formulations w/Zerogen ® 10

|  | 1 | 11 |
|---|---|---|
| Geon 86 × 1 | — | 65.00 |
| Geon 855 × 1 | 70.00 | — |
| Temprite 674 × 571 | 30.00 | 35.00 |
| Saniticizer 148 | 16.00 | 16.00 |
| TiO$_2$, R902 | 4.00 | 2.00 |
| Pol-U | 4.00 | 6.00 |
| Micral 932 CM | 90.00 | 80.00 |
| H(DYT) D80 | 18.00 | 12.00 |
| H(TBS) D80 | 8.00 | — |
| Antimony Trioxide | 4.00 | 5.00 |
| Vamac-G | 45.00 | 35.00 |
| Irganox 1010 | .30 | .30 |
| Zinc Borate (ZB223) | 7.00 | — |
| Struktol TR016 | 2.00 | 1.00 |
| Jayflex TINTM | 7.00 | 8.00 |
| Whitex Clay | 15.00 | — |
| P-Tone 700 | 20.00 | 18.00 |
| Calcium Stearate | — | 1.50 |
| Zerogen 10SP | — | 20.00 |

TABLE 13

Improved Jacket Formulations w/Zerogen ® 10 Physical Properties

|  | 1 | 11 |
|---|---|---|
| Density, gm/cm$^3$ | 1.583 | 1.583 |
| Hardness, Shore A, 10 sec. | 87 | 86 |
| Hardness, Shore D, 10 sec. | 56 | 42 |
| Tensile Strength, psi | 2800 | 2800 |
| Ultimate Elongation, % | 230 | 253 |
| Limiting Oxygen Index, % | 42.5 | 53.0 |
| Dm Smoldering | 85 | 90 |
| Dm Flaming | 113.4 | 96 |
| Brittle Temp., ° C. | −15 | 0.0 |
| Air Oven Aging (7 days at 100° C.) | | |
| Tensile Retention, % | 112.3 | 113 |
| Elongation Retention, % | 65.8 | 86 |

TABLE 14

Improved Jacket Formulations w/ Zerogen ® 10

|  | 1-1 | 11-1 |
|---|---|---|
| Geon 86 × 1 | 70.00 | 65.00 |
| Temprite 674 × 571 | 30.00 | 35.00 |
| Saniticizer 148 | 16.00 | 16.00 |
| Vamac-G | 45.00 | 35.00 |
| TiO$_2$ R-902 | 4.00 | 2.00 |
| Pol-U | 4.00 | 6.00 |
| Micral 932 Cm | 90.00 | 80.00 |
| H(DYT) D80 | 16.00 | 12.00 |
| Antimony Trioxide | 4.00 | 5.00 |
| Irganox 1010 | 0.30 | 0.25 |
| ZB223 (Zinc Borate) | 7.00 | — |
| Strucktol TR016 | 2.00 | 1.00 |
| Jayflex TINTM | 7.00 | 8.00 |
| Whitex Clay | 15.00 | — |
| P-tone 700 | 20.00 | 18.00 |
| Zerogen 10 SP | — | 20.00 |

TABLE 14-continued

Improved Jacket Formulations w/ Zerogen® 10

|  | 1-1 | 11-1 |
|---|---|---|
| Calcium Stearate | — | 1.50 |
| Physical Properties |  |  |
| Density, gm/cc | 1.586 | 1.576 |
| Hardness, Shore D, 10 sec. | 48 | 46 |
| Tensile Strength, psi | 2800 | 2800 |
| Ultimate Elongation, % | 230 | 220 |
| Limiting Oxygen Index, % | 43 | 53 |
| NBS Smoke |  |  |
| DM Smoldering | 90 | 125 |
| DM Flaming | 135 | 73 |
| Air Oven Aging (7 days at 121° C.) |  |  |
| Retention on tensile, % | 136 | 121 |
| Retention on elongation, % | 79 | 73 |
| Brabender Stability, Min. at 400° F., 63 RPM | 58 | >120 |
| Rheology, 14 min. | 1.3 | .5 |

In Tables 12–14, the improved properties produced through the addition of the Zerogen® magnesium hydroxide (see formulations 1-1 and 11-1) to the previous preferred jacket composition (i.e. formulations 1 and 11) are exhibited. In this regard, formulations 1 and 11 and 1-1 and 11-1 are very similar. These formulations were utilized in order to demonstrate the improved results produced by the addition of the Zerogen® magnesium hydroxide under different conditions (i.e. tested at different times under different conditions, etc.). As a result of the improvements in properties such as limiting oxygen index, etc., the Zerogen® magnesium hydroxide formulations (i.e. 1-1 and 11-1) are preferred over the previously preferred embodiments (i.e. 1 and 11) for jacket compositions.

TABLE 15

Improved Jacket Formulations w/ Ultracarb®

|  | 12 | 13 | 14 |
|---|---|---|---|
| Geon 86 × 1 | 65.00 | 65.00 | 65.00 |
| Temprite 674 × 571 | 35.00 | 35.00 | 35.00 |
| Pol-U | 6.00 | 6.00 | 6.00 |
| Micral 932 SP | 90.00 | — | — |
| Micral 932 CM | — | 110.00 | 120.00 |
| Saniticizer 148 | 13.00 | 13.00 | 16.00 |
| H(DYT) D80 | 8.00 | 8.00 | 10.80 |
| Irganox 1010 | 0.30 | 0.30 | 0.30 |
| $TiO_2$, R902 | 5.00 | 5.00 | 5.00 |
| Jayflex, TINTM | 8.00 | 8.00 | 8.00 |
| Vamac-G | 45.00 | 45.00 | 45.00 |
| Calcium Stearate | 0.50 | 0.50 | 1.00 |
| Zerogen 10 SP | 30.00 | — | — |
| P-tone 700 | 20.00 | 20.00 | 20.00 |
| Antimony Oxide | 5.00 | 5.00 | 5.00 |
| Paraffin Wax | 1.00 | 1.00 | 1.00 |
| LQ 638 T | 2.00 | 3.00 | 3.00 |
| ZB 223 | 8.00 | 8.00 | 8.00 |
| Ultracarb P5-20 | — | 60.00 | 60.00 |
| Physical Properties |  |  |  |
| Density, gm/cm³ | 1.589 | 1.660 | 1.650 |
| Hardness Shore D, 10 sec. | 52 | 54 | 55 |
| Tensile strength (psi) Ultimate | 2700 | 2750 | 2800 |
| Elongation, % | 185 | 195 | 195 |
| Limiting Oxygen Index, % | 54 | 61 | 62 |
| Dm, Smoldering | 78.8 | 95.5 | 95.0 |
| Dm, Flaming | 104 | 103.5 | 101 |
| Air Oven Aging, 90° C. Rating (7 days at 121° C.) |  |  |  |
| Tensile Retention, % | 141 | 140 | 140 |
| Elongation, Retention, % | 71 | 50 | 62 |
| Brabender Stability (63 rpm, 400° F.) | >120 min. | >120 min. | >120 min. |
| Rheology, Monsanto Carpillary Rheometer (out 14 min.) | 0.58 | 0.31 | 0.30 |

Table 15 demonstrates the improved properties produced as the result of the incorporation of the partially hydrated magnesium calcium carbonate compositions sold by Atochem, Inc., under the tradename Ultracarb® (see improved jacket formulations 13 and 14) in comparison to that of the improved jacket formulation produced by the addition of the Zerogen® magnesium hydroxide composition (see improved jacket formulation 12). As a result of various improvements in a number of different properties, these three formulations can be utilized to produce jacket composition depending upon the overall characteristics desired.

Thus, the improved compositions of the present invention exhibit not only enhanced physical properties, but also improved flame resistant and smoke producing properties.

The invention has been described with reference to the preferred embodiments. Obviously, modifications and alterations will occur to others upon reading and understanding the preceding detailed description. It is intended that the invention be construed as including all such alterations and modifications insofar as they come within the scope of the claims and the equivalents thereof.

Having thus described the preferred embodiments, the invention is now claimed to be:

1. In a thermoplastic composition for plenum cable construction exhibiting enhanced fire-resistance, low smoke and physical properties comprising a poly(vinyl chloride) resin, a chloride poly(vinyl chloride) resin, at least one filler, at least one molybdenum compound which acts as a flame retardant and at least one poly(vinyl chloride) resin compatible plasticizer, the improvement wherein said composition comprises:

from about 10 to about 50 parts per hundred parts of the combined amount of said poly(vinyl chloride) resin and said chlorinated poly(vinyl chloride) resin, of an ethylene acrylic elastomer comprised of ethylene and methyl acrylate and a third monomer containing carboxylic curing sites.

2. The composition of claim 1 comprising the following materials, amounts being expressed as parts per hundred parts of the combined amount of said poly(vinyl chloride) resin and said chlorinated poly(vinyl chloride) resin in the composition:

a) from abut 65 to about 95 parts of said poly(vinyl chloride) resin;

b) from about 5 to about 35 parts of said chlorinated poly(vinyl chloride) resin;

c) from about 10 to abut 120 parts of a hydrated alumina;

d) from abut 2 to about 10 parts of said molybdenum compound;

e) from about 4 to about 35 parts of isodecyl diphenyl phosphate;

f) from about 6 to about 18 parts of a poly(vinyl chloride) heat stabilizer;

g) from about 0.1 to about 0.3 parts of a poly(vinyl chloride) antioxidant;

h) from about 0.5 to about 6.0 parts of a poly(vinyl chloride) lubricant;

i) from abut 7.0 to abut 14.0 parts of a secondary poly(vinyl chloride) plasticizer; and j) from about 2.0 to about 6.0 parts of antimony trioxide.

3. The composition of claim 2, further comprising:

a) up to about 50 parts of a magnesium hydroxide; and, b) up to about 60 parts of a partially hydrated magnesium calcium carbonate.

4. The composition of claim 2, further comprising from about 2.0 to about 5.0 parts of titanium dioxide.

5. The composition of claim 2, further comprising from about 15.0 to 40.0 parts of a higher molecular weight caprolactone polymer.

6. The composition of claim 2, further comprising from about 4.0 to 10.0 parts zinc borate.

7. The composition of claim 2, further comprising from about 10.0 to about 20.0 parts of a poly(vinyl chloride) filler.

8. The composition of claim 7, wherein said poly(vinyl chloride) filler is an aluminum silicate.

9. The composition of claim 2, wherein said poly(vinyl chloride) lubricant is calcium stearate.

10. The composition of claim 2, wherein said molybdenum compound is molybdenum oxide.

11. The composition of claim 2, wherein said poly(vinyl chloride) heat stabilizer is a dibasic lead phthalate.

12. The composition of claim 2, wherein said poly(vinyl chloride) heat stabilizer is a tribasic lead sulfate.

13. The composition of claim 2, wherein said secondary poly(vinyl chloride) plasticizer is triisonomyl trimellitate.

14. The composition of claim 2, wherein said poly(vinyl chloride) is produced by a mass polymerization process.

15. The composition of claim 2, wherein said poly(vinyl chloride) is produced by a suspension polymerization process.

16. The composition of claim 2, comprising:

a) from about 30 to about 50 parts of said ethylene acrylic elastomer;

b) from about 45 to about 120 parts of said hydrated alumina;

c) from abut 12 to about 35 parts of said isodecyl diphenyl phosphate;

d) from about 10 to about 18 parts of said poly(vinyl chloride) heat stabilizer;

e) from about 7.0 to about 14.0 parts per hundred resin of triisononyl trimellitate;

f) from about 2.0 to about 5.0 parts of titanium dioxide;

g) from about 4.0 to about 10.0 parts of zinc borate;

h) from about 10.0 to about 20.0 parts of poly(vinyl chloride) filler;

i) from about 15.0 to about 35.0 parts of a high molecular weight caprolactone polymer;

j) from about 10.0 to about 50.0 parts of a magnesium hydroxide; and k) from about 10.0 to about 60.0 parts of a partially hydrated magnesium calcium carbonate.

17. The composition of claim 16, wherein said poly(vinyl chloride) heat stabilizer is a dibasic lead phthalate.

18. The composition of claim 16, wherein said poly(vinyl chloride) heat stabilizer is a tribasic lead sulfate.

19. The composition of claim 16, wherein said poly(vinyl chloride) lubricant is calcium stearate.

20. The composition of claim 16, wherein said poly(vinyl chloride) filler is an aluminum silicate.

* * * * *